United States Patent
Delcourt et al.

(10) Patent No.: US 12,375,486 B2
(45) Date of Patent: Jul. 29, 2025

(54) SYSTEMS AND METHODS FOR INTERNET-WIDE MONITORING AND PROTECTION OF USER CREDENTIALS

(71) Applicant: Akamai Technologies, Inc., Cambridge, MA (US)

(72) Inventors: Emile Delcourt, Wellesley, MA (US); Harish Somaraddi, Cambridge, MA (US); Tadhg Pearson, Somerville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 149 days.

(21) Appl. No.: 17/206,305

(22) Filed: Mar. 19, 2021

(65) Prior Publication Data

US 2021/0400041 A1    Dec. 23, 2021

Related U.S. Application Data

(63) Continuation of application No. 16/014,033, filed on Jun. 21, 2018, now Pat. No. 10,958,649.

(Continued)

(51) Int. Cl.
*H04L 9/40* (2022.01)

(52) U.S. Cl.
CPC ...... *H04L 63/0884* (2013.01); *H04L 63/0823* (2013.01); *H04L 63/123* (2013.01); *H04L 63/20* (2013.01); *H04L 2463/082* (2013.01)

(58) Field of Classification Search
None
See application file for complete search history.

(56) References Cited

U.S. PATENT DOCUMENTS

| 8,955,055 | B1 * | 2/2015 | Bogdanovic | G06F 21/85 726/4 |
| 10,958,649 | B2 | 3/2021 | Delcourt et al. | |

(Continued)

FOREIGN PATENT DOCUMENTS

| KR | 102374193 | * | 8/2015 |
| KR | 102374193 B1 | * | 8/2015 |

OTHER PUBLICATIONS

EP Exam report for EP Application 19771809.1, counterpart to current case, mailed on Nov. 24, 2022, 4 pages.

(Continued)

*Primary Examiner* — Taghi T Arani
*Assistant Examiner* — Joshua Raymond White

(57) ABSTRACT

Among other things, this document describes systems, methods, and apparatus for monitoring and protecting a user credential issued by an organization when that credential is used outside that organization's network security perimeter. For example, a reverse proxy server (RPS) receives a client request directed to a content provider's site. The RPS initiates a process that involves parsing the request message and extracting a user credential. The RPS locates a credential policy from the credential owner based on the user credential. The RPS can issue an API request to a credential service that is authoritative for the credential. That credential service may return a directive to the RPS specifying how to handle the client request message. Preferably, the operation is transparent to the content provider whose site was the target of the client's request message. Activity records can be presented in visualizations that enhance security analysts' tactical comprehension at a glance.

12 Claims, 11 Drawing Sheets

Related U.S. Application Data

(60) Provisional application No. 62/645,833, filed on Mar. 21, 2018.

(56) References Cited

U.S. PATENT DOCUMENTS

| | | | | |
|---|---|---|---|---|
| 2007/0234408 | A1* | 10/2007 | Burch | G06F 21/31 |
| | | | | 726/6 |
| 2010/0011053 | A1* | 1/2010 | Bhogal | G06Q 10/00 |
| | | | | 709/206 |
| 2016/0234249 | A1* | 8/2016 | Wong | H04L 63/101 |
| 2017/0026343 | A1* | 1/2017 | Wardman | H04L 63/0421 |
| 2018/0167412 | A1* | 6/2018 | Barrett | H04L 63/1491 |
| 2018/0332079 | A1* | 11/2018 | Ashley | H04L 63/20 |
| 2019/0123904 | A1* | 4/2019 | Ackerman | G06F 21/554 |
| 2019/0268324 | A1* | 8/2019 | Sailappan | H04L 63/10 |
| 2019/0297079 | A1 | 9/2019 | Delcourt et al. | |

OTHER PUBLICATIONS

EU Application 19771809.1, counterpart to current application, Supplementary European Search Report, mailed on Nov. 16, 2021, 7 pages.
Stebila, D. et al., "An Analysis of TLS Handshaking Proxying", IEEE Trustcom/Bigdatase/ISPA, IEEE. vol 1, Aug. 20, 2015, pp. 279-286, 8 pages.
U.S. Appl. No. 16/014,033, filed Jun. 21, 2018, available in USPTO files, parent application hereof.
Communication Under MPEP § 609.02, letter submitted with this SB/08 form, Mar. 19, 2021, 1 page.

* cited by examiner

SYSTEMS AND METHODS FOR INTERNET-WIDE MONITORING AND PROTECTION OF USER CREDENTIALS

BACKGROUND

Technical Field

This application relates generally to information security and more particularly to methods and system for monitoring and protecting user credentials when used on the Internet, including in particular when used outside the security perimeter of the organization that issued them.

BRIEF DESCRIPTION OF THE RELATED ART

A large number of federated authentication solutions are available for individual consumers or organizations to secure and simplify login from their network or to their selection of integrated cloud applications. In this context, the term organization refers broadly to enterprises, governments, non-governmental organizations, associations, and any other entity. A login typically requires that a user must authenticate via the presentation of some set of user credentials, typically a username and password, but also possibly a token, temporary code, phone number, client certificate, or other form of credential. Authorization to access the requested resource is then based on the identity, role, and/or group membership of the authenticated user. An organization issuing a user credential (e.g., such as an email address) has an interest in monitoring its use and protecting its integrity. Malicious, risky, or unauthorized use of the credential can compromise not only the user but the organization. Compromised user accounts need to be detected quickly and mitigated.

The federated authentication segment of the IT ecosystem includes identity and access management (IAM) solutions, Cloud Access Security Broker (CASB), and User Entity and Behavior Analytics (UEBA). These solutions typically provide an enterprise or other organization with control over authentication to designated sites and some limited visibility or control over unsanctioned site access, such as attempts to access entrusted applications, network or systems, where such attempts are made from or to the enterprise's networks ("Shadow IT"). UEBA allows the detection of suspicious user activity, such as a malicious or compromised insider account, by deploying anomaly detection system integrated with the organization's network, sometimes an external source.

On enterprise infrastructure, information security departments also benefit from Security Information and Event Management (STEM) and Web Application Firewall (WAF) solutions, some of which enable detection of unauthorized or automated credential abuse on endpoints managed by the organization or via an organization's partner.

But, none of these solutions give visibility or control over the use of a credential issued by organization when it is used to access sites and/or cloud provider platforms (managed by 3rd parties with whom the organization has no relationship) external to the organization, or Internet-wide. This is particularly a problem when users login to third party sites while working remote or otherwise outside of the organization's network. There is today no practical, affordable way for an organization's IT department to deploy integrated/federated authentication to every site and system on the internet. Nor is there a way to monitor or control the use of credentials to authenticate or create third party accounts that are initiated by malicious actors outside the organization's perimeter, to systems not integrated with the organization.

The teachings hereof address these and other needs that will become apparent in view of the teachings hereof.

BRIEF SUMMARY

Among other things, this patent document describes systems, methods, and apparatus for monitoring and securing a user credential, such as a company email address. These systems, methods, and apparatus are particularly applicable to monitor use that user credential when it is used outside of the network infrastructure of the organization that owns it (e.g., outside the company's enterprise network) and even when the user credential is used outside the infrastructure of a directly or indirectly integrated vendor. Put another way, the teachings hereof can be used to protect against the misuse of company or other institutional credentials even outside of a security perimeter, with analytics, anomaly alerts, and mitigations.

One embodiment of a system in accordance with the teachings hereof leverages a set of reverse proxy servers distributed around the Internet that proxy content from content provider origin websites to requesting end user clients. The reverse proxies may be organized into a distributed computing platform known as a content delivery network (CDN) platform, as known in the art.

In a typical CDN, a given reverse proxy server receives a request directed to a given content provider's website and/or web application. The request may be an HTTP request, such as a GET or POST, and may include authentication parameters or otherwise represent an authentication request (including but not limited to, logins, new accounts, and subscriptions).

According to the teachings hereof, upon receiving a request from the client that is or may be an authentication request, the reverse proxy server can initiate an intermediate process, preferably executed before obtaining the requested content from local cache or the content provider origin. The intermediate process can involve parsing the request message and extracting a user credential therefrom. Based on the user credential, the reverse proxy server locates a particular credential policy stored at the reverse proxy, and/or issues a request to a service (eg API/database or similar) that is authoritative for the credential. That API service is typically provided by or designated by the organization that issued the credential or otherwise has an interest in safeguarding it use. The request to the API preferably includes credential metadata, which may take a variety of forms but for example can include information about the use of the credential, such as a time, location, website to which the user is accessing, origin and format of the request, associated metrics of the network session that generated the request, and the like. A monitoring and analysis engine sitting logically behind the API service ingests this information. That engine is monitoring use of user credentials from the organization whenever they are used across the Internet (e.g., based on reports like the one sent from the given reverse proxy server), and it is employing algorithmic and/or machine learning techniques and rules to flag anomalous use. Preferably, the techniques and rules are defined securely by the organization or credential owner in an initial setup phase where their ownership of the credential(s) are verified. At the individual or organizational level, rules may whitelist or blacklist locations, sites, client types, networks and even times of access, with various levels of enforcement, with similar methods of applying to algorithmically detected anomalies.

As such, the service can return a deny or an allow directive, verify or delegate an additional verification process, such as requesting a two factor authentication, or other kind of directive, to the reverse proxy server. The reverse proxy applies this directive, blocking the use of the user credential on the content provider website or allowing the message to pass through, or issuing a two factor authentication challenge, for example. Preferably, although optionally, the entire credential monitoring operation is transparent to the website or web application with which the client is intending to reach.

Also described herein are specialized visualizations that enhances security analysts' tactical comprehension at a glance.

The foregoing is a description of certain aspects of the teachings hereof for purposes of illustration only; it is not a definition of the invention nor are all aspects set forth above necessarily part of the invention. The claims define the scope of protection that is sought, and are incorporated by reference into this brief summary.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any description of advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

Figure 1:
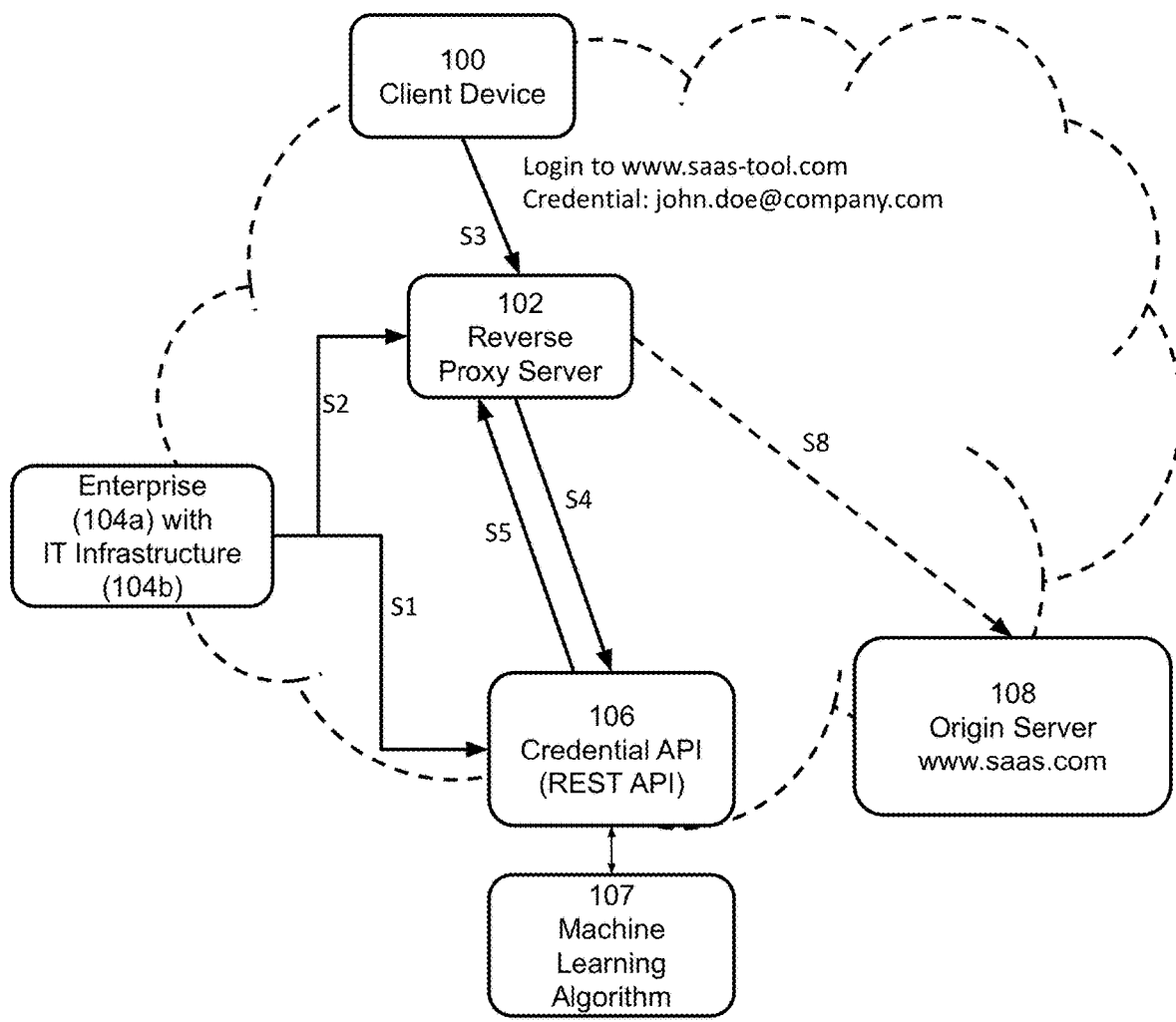
FIG. 1 is a block diagram illustrating one embodiment of a system in accordance with the teachings hereof.

FIG. 1 is a diagram of a system embodiment. The system includes a reverse proxy server 102, which is preferably one of a plurality of such reverse proxy servers distributed around the Internet (not all shown). The set of reverse proxy servers are preferably arranged as a content delivery network (CDN) platform, as known in the art. The reverse proxy servers deliver content to requested end user client devices such as client device 100 on behalf of content providers, here illustrated as a web application provider who operates origin server 108, who have integrated their origin sites with the CDN for this purpose. In general, client devices query the reverse proxy servers for content and the reverse proxy servers respond with the content provider's content, obtained from a local cache or from the origin server if unavailable in cache. In some cases, such reverse proxies are referred to as edge servers due to their deployment at the edges of the Internet. More information about CDNs and content providers can be found in U.S. Pat. No. 6,108,703, the contents of which are hereby incorporated by reference in their entirety. Additional information about CDNs is also provided later in this document.

Preferably, the reverse proxy server 102 is located in a data center of an internet service provider on the public Internet. The data center may be in an access network or a peering point. As noted, the reverse proxy server 102 is but one of many servers in a CDN. The other proxy servers 102 may be deployed in the same data center and in other data centers in various networks around the Internet.

Origin server 108 is also accessible from the public Internet and that server 108 hosts a web application, also referred to herein as a SaaS tool, at www.saas.com. The operator of the origin server 108 is a web application provider; this represents an example of a content provider as mentioned above. A SaaS tool is merely an example, as the teachings hereof apply to attempted logins on any content provider site handled by the CDN.

Enterprise IT infrastructure 104*a*-*b* represents the IT infrastructure 104*l*) of an enterprise 104*a* deployed in one or more data centers behind the enterprise firewall or other devices that form a security perimeter. The single block 104*a*-*b* thus represents a collection of enterprise servers, LAN, WAN, VPNs, enterprise-issued user devices such as company laptops, and the like. The credential API 106 is typically hosted on a server accessible from the public Internet. In some embodiments, credential API 106 may be hosted in the enterprise data center, in which case blocks 104 and 106 could be combined. (The enterprise is being used here as an example of an organization that owns a user credential.) And in another embodiment, the enterprise may publish the URL for Credential API 106 in their Domain Name System, e.g., using a TXT, KX or PTR record, or using a CNAME for which the record name would follow a convention ("authentication-api[organization.com]"). Doing so enables Internet applications and systems performing authentication to find via. DNS query the correct credential api system as a matter of domain wide policy for any organization.

In one embodiment, the system shown in FIG. 1 can operate as follows. It should be assumed that the enterprise 104*a* has issued a user credential to the user of the client device 100 in a process not shown in FIG. 1. The user credential may be an email address or a token or phone number issued to an employee for example. The user credential may be a transport layer security (TLS) certificate installed on the user's client device for client authentication as part of a MS handshake. The teachings hereof are not limited to any particular user credential or credential issuance process.

At S1 and S2, the enterprise 104*a* sends information about the use of its credentials with the reverse proxy server 102 and a credential API, referred to herein as a credential policy. This means that the enterprise (a credential owner) specifies permissible and impermissible uses of user credentials that it issued.

The credential policies sent to the reverse proxy server 102 and the credential API platform 106 may or may not be different from one another. In one embodiment, the credential policy sent to the credential API 106 at S1 may include a wide range of information, such as:

Domain names for which use of the credential should always be allowed (whitelist)

Domain names for which use of the credential should always be blocked (blacklist)

Rules for use of the user credential where permission is user-based, role-based, or group-based, or based on target domain name (collectively referred to as the 'usage policy')

Rules/criteria for invoking Two Factor Authentication

Rules for certain user agents, geolocation, AS numbers and/or CIDR blocks, and/or connection types (cloud, tor, proxy, home/work networks)

Request metadata

Compiled anomaly analysis based on "normal" user behavior, such as that collected by a Javascript library or SDK on a user's client device Machine learning behavior based on any of the above factors The credential policy above that was sent to the Credential API 106 by the credential owner, can also be sent to the reverse proxy server 102. Or alternatively, a reduced set of information is sent instead, which is sometimes referred to as an "edge" credential policy. This is illustrated by S2 in FIG. 1. Either way, the credential policy sent to the reverse proxy server 102 at S2 may include a wide variety of information, such as:

Any of the information listed above for the credential policy S1 for the Credential API 106

Domain names for which the Credential API 106 should be contacted

Global caching parameters for directives received from the Credential API 106

The hostname and/or IP address and/or other contact information for the computer hosting the Credential API 106

Algorithmically or learning-derived parameters

As those skilled in the art will understand, a credential policy could also specify whether the use of the user credential is permissible based on source or destination IP address, source or destination country, or source or destination network (AS), or other factors, using a wide variety of logical conditions and/or blanket rules.

In another embodiment, the credential owner can provide a credential policy to the Credential API server 106, and the proxy server 102 can pull the policy information it needs (either the entire policy or portions thereof useful to the proxy 102) synchronously to performing a check on a client request.

A CDN service provider typically offers a customer interface (sometimes referred to as a user 'portal') through which the credential owner can configure the credential policy for the reverse proxy server 102. The customer interface may be programmatic (e.g., an API) and/or web-based, or otherwise. The CDN service provider can then takes care of distributing the credential policy to its servers using, for example, a solution for distributing and utilizing per-customer server control and configuration information to servers. Examples of such a system, which may be repurposed for distributing the policies referred to herein, are described in U.S. Pat. Nos. 7,240,100 and 9,667,747 and 9,654,579 and 9,509,804, the contents of all of which are hereby incorporated by reference for all purposes. Put another way, the "metadata" distribution solution described in those patents can be used for effecting S2, in FIG. 1

At S3, an end-user attempts to authenticate to a web application at target hostname 'www.saas.com' with the user credential 'john.doe@company.com'. Assume, by way of example, that the end user 'john.doe' is an employee of the enterprise 104*a* and the client device 100 is outside the enterprise security perimeter. The employee may be working from home or while traveling. Of course, the authentication process may involve sending one or more additional user credentials as well, e.g., a password, but here the example is the user credential of the work email.

The reverse proxy server 102 can be authoritative for delivering content for www.saas.com, because the web application provider is a customer of the CDN that operates the reverse proxy server 102. There are many techniques in known in the art for routing of client requests to a CDN's reverse proxy server 102 rather than to the origin server 108, example, the web application provider may alias the www.saas.com to the CDN. This may be accomplished via CNAME in a DNS record, or the CDN may provide authoritative DNS service for that hostname via outsourced DNS service and/or zone delegation, or IP Anycast may be used, all of which are known in the art. The result is that the HTTP requests for a web application at www.saas.com are directed to the IP address of the reverse proxy server 102. If a TLS connection is required, which is typical, then the CDN usually has access to the certificate and private keys of the web application provider, i.e., the certificate applicable to www.saas.com and the private key of the web application provider.

Following request redirection, the reverse proxy server 102 proxies the messages between the client device 100 and the web application hosted at www.saas-tool.com. Also, the reverse proxy server 102 may serve content from its local cache, rather than retrieving if from origin (the server 108), in response to a client request, assuming such the requested content is available and valid to serve from the cache. Such caching proxy operations are known in the art.

However, according to the teachings hereof, the conventional operation of the reverse proxy server 102 at least in that the reverse proxy server 102 monitors the transmitted HTTP messages on the wire to detect the use of the user credential that was issued by the enterprise 104*a*.

Upon receiving a message (at S3) that may be a potential authentication attempt or otherwise may include a user credential, the reverse proxy server 102 examines the message. An authentication attempt to a web application is typically effected using an HTTP POST request, although the teachings hereof are not limited to HTTP POST requests. The client device 100 may send any number of HTTP messages or other messages that are not authentication attempts before the authentication attempt with the user credential. Hence the reverse proxy server 102 can look for POST messages (i.e., amongst HTTP GET messages and other messages) and then determine whether the POST is in fact an authentication attempt. The reverse proxy server 102 can verify whether the POST is part of an authentication by examining its URL and/or body. The reverse proxy server 102 can further examine the body of the message for a user credential pattern, e.g., an email address or other user configured credential format. When the email domain is from a registered credential owner, such as the enterprise managing data center 104*a-b*, the server 102 finds the associated policy of the credential owner (from S2) and applies that policy. For example, if the user credential were the email address john.doe@company.com, the reverse proxy server 102 can locate the policy for "company.com" in an internal data store. If the user credential is a soft token, then the reverse proxy server 102 could look at a particular data string in the token to determine the credential owner. This data string might be standardized industry-wide as indicating the credential owner. If the credential were a phone number, then the area code and exchange (which may be assigned to an organization, i.e., phones numbers of the form (+1 123-456-XXX) are all designated for a particular company.

In another embodiment, the policy for "company.com" can be located in a database or other data structure that accessible to the proxy server 102 via a network interface. The database may be located on a local network (for example, in the same data center) or in a remote computer located elsewhere on the Internet. The particular product and design goals, as well as available resources, will drive such implementation details.

Generalizing, the reverse proxy server obtains the applicable local credential policy of the credential owner based on the email domain name or other content embedded in the user credential, which typically indicates the credential owner.

Once the reverse proxy server 102 has identified the user credential in the message, it locates the applicable credential policy, which was received at S2. If the corresponding credential policy is not stored locally as a result of S2, the server 102 can fetch it in real-time from the enterprise infrastructure 104.

The reverse proxy server 102 parses the local credential policy to determine how to handle the message. Some actions might be defined within the policy itself, such as a blacklist of prohibited domains for all user credentials issued by the given user. In the case of the blacklist, the reverse proxy server 102 can examine the destination domain (e.g., as indicated by the Host Header in the HTTP message) to determine if the message should be sent to the web application hosted by SaaS server 104. This is but one example. In general, the reverse proxy server 102 executes the policy by taking whatever actions are specified in the policy for the given user credential and the destination. The 'destination' may be indicated by the particular URL, URL path, hostname, IP address, or the like, or any combination thereof.

In a preferred embodiment, the credential policy received at S2 instructs the reverse proxy server 102 to contact the Credential API 106. This is done to verify that the use of the user credential is permitted, and the message sent by the reverse proxy server 102 is referred herein to as a verification message, shown in FIG. 1 as S4.

Preferably the reverse proxy server 102 includes in the verification message a number of pieces of information, such as the user credential itself, the connection type with the client device (e.g., cloud, tor, proxy, home/work networks), protocol, destination hostname, destination IP address, and URL, the date and time, the source IP address of the client device, user agent, and/or other information. Preferably the server 102 anonymizes the user credential before sending it to the Credential API 106. For example, the server 102 can apply a cryptographic hash function such as an HMAC to create an anonymous unique_id. The server 102 could also include in the verification message at S4 the recent history of message activity on the wire, such as one or more HTTP requests that were issued by the client prior to the authentication attempt that is under examination.

The Credential API server 106 performs an analysis and determines what action to apply. The Credential API server 106 responds at S5 with a directive to the reverse proxy server 102. The teachings of this patent document are agnostic as to the analysis and/or logic applied by the Credential API server 106 to determine whether the pending use of the user credential to authenticate to the given web application should be allowed. Characteristics for consideration by this arbitrary analysis may include (but not limited to): timing, location, network, connection, prior knowledge regarding the source of the request, prior knowledge about the usage history for this user credential, request formatting or header structure/contents, etc. However; in one embodiment, an analysis is performed with a machine learning algorithm 107 that learns the expected pattern and frequency with which the user credential is used, and then looks for anomalies. Hence the machine learning algorithm can decide, in a given instance and based on past history, whether the present use of the user credential is anomalous. Examples of machine learning algorithms that can be used include a support vector machine algorithm. For background on support vector machines, see U.S. Pat. No. 9,569,401, the contents of which are hereby incorporated by reference for all purposes.

As mentioned above, preferably the user credential is anonymized. In this case, the machine learning algorithm simply tracks the pattern and frequency of use for the anonymous unique_id corresponding to the user credential of interest.

As those skilled in the art will understand, over time a machine learning algorithm will learn from the data in verification messages sent by the reverse proxy server 102. It should be remembered that the reverse proxy server 102 is preferably one of many such servers deployed around the Internet as part of the CDN, all or many of which can be sending verification messages to augment the data set available to the Credential API server 106. In this way the machine learning algorithm gains an increasingly robust view as to how the user credential is being used over time and across all sites handled by the CDN across the Internet.

Of course, the Credential API server 106 can also utilize blacklists and whitelists, similar to that described already. Such lists and logic may be specified in the credential policy sent at S1 to the server 106.

Returning to S5, the directive sent from the Credential API server 106 to the reverse proxy server 102 can have a variety of information. In one embodiment, it instructs the reverse proxy server 102 to 'allow' the use of the user credential, to 'deny' that use, and/or to generate an 'alert' for another system or in a log. Preferably, the alert serves to notify a system administrator of the enterprise 104a, about the misuse of the credential, which may indicate that an account has been compromised, or that the user credential is being used by an employee contrary to the enterprise's corporate guidelines/rules.

In some implementations, the directive from the Credential API server 106 could also instruct the reverse proxy server 102 to further authenticate the user before allowing the message to be processed, which will be explained below in connection with FIG. 2.

If the use of the user credential is allowed, the reverse proxy server 102 can simply process the message in the usual way, applying configuration and control parameters that have been specified by the web application provider for www.saas.com, the customer of the CDN. Such parameters may be contained in a "metadata" control file, as known in the art, see U.S. Pat. No. 7,240,100, and distributed to CDN servers as described therein; the contents of that patent are hereby incorporated by reference). Based on the instructions in the "metadata", the reverse proxy server 102 may forward the message to the origin server 108. This is shown in FIG. 1 by the dotted line S8.

If the use of the user credential is not allowed, then the reverse proxy server 102 can drop the HTTP POST or other message that represented the authentication attempt.

Whether allowed or denied or alerted, the action is preferably transparent to the origin server 108 and to the web application provider customer associated therewith. Put another way, the origin server 108 need not be informed that the reverse proxy server 102 checked the user credential against a policy or for anomalous use.

The HTTP POST message processing and the intermediary process of extracting the data in the POST body and querying a remote server with extracted data can be implemented using the teachings described in US Patent Publication No. 2012/0096546, and the contents of that published patent application are hereby incorporated by reference for all purposes.

Figure 2:
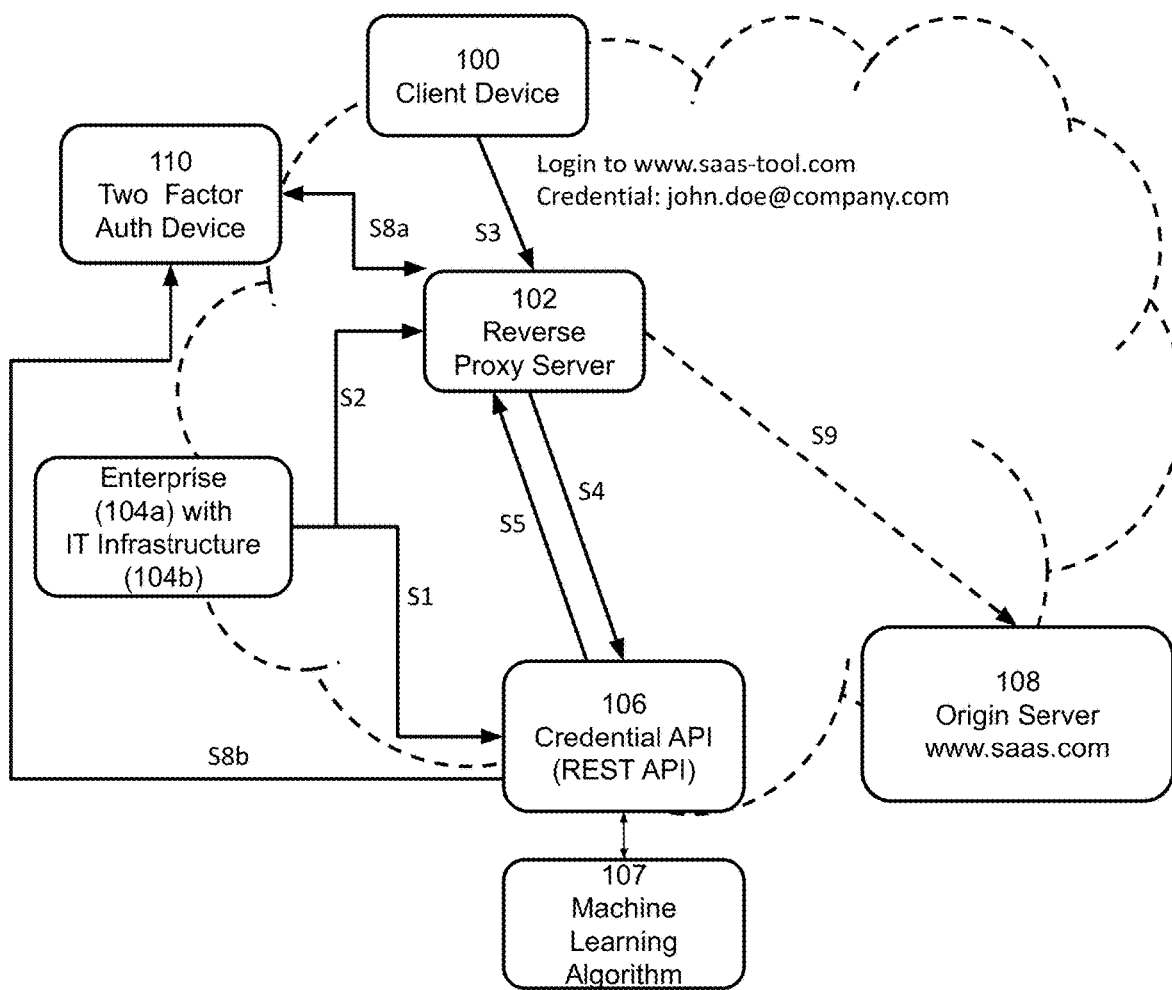
FIG. 2 is a block diagram illustrating another embodiment of a system in accordance with the teachings hereof.

FIG. 2, shows an alternate system embodiment. FIG. 2 largely tracks FIG. 1, except that before allowing the authentication request to go to origin at 59, the system sends the end user a two factor authentication request. The two factor authentication request could be initiated by the Credential API Server 106 at S8a, or by the reverse proxy server 102 at S8b. In the latter case, the proxy server 102 may initiate the two factor authentication pursuant to a directive received from the Credential API server 106 at S5, an internally stored policy, or a directive that the reverse proxy server 102 previously received from the Credential API server 106 and cached. The proxy server 102 and/or the credential API server 106 may also delegate the two factor authentication execution to a third party, e.g., a two factor authentication platform. Either way, this means that a second means of authentication is employed to authenticate. A wide variety of two factor authentication mechanisms are known the art, but as one example, the system can send a request to a second device of the user, shown as 'Two Factor Auth' device 110 in FIG. 1, prompting the individual john.doe to independently approve or deny the pending use of the credential 'john.doe@company.com' for login.

It should be understood from the above that the two factor authentication request may be initiated by any of several different actors in the system shown in FIG. 2. For example, two factor authentication can be initiated by the reverse proxy server 102 based on a directive to do further authentication sent from the Credential API server 106 at S5, or based on an instruction in the credential policy S2, or otherwise. The two factor authentication request may be initiated by the Credential API Server 106 based on the credential policy S3, based on the decision of the machine learning algorithm 107, or otherwise. Furthermore, either of the reverse proxy server 102 and the Credential API 106 could delegate the execution of the two factor authentication to a third party platform. The credential owner (enterprise 104a-b in FIG. 2) can also be responsible for executing the two factor authentication sub-process, even for example using (if available) an organization's already deployed two factor authentication solution.

Figure 3:
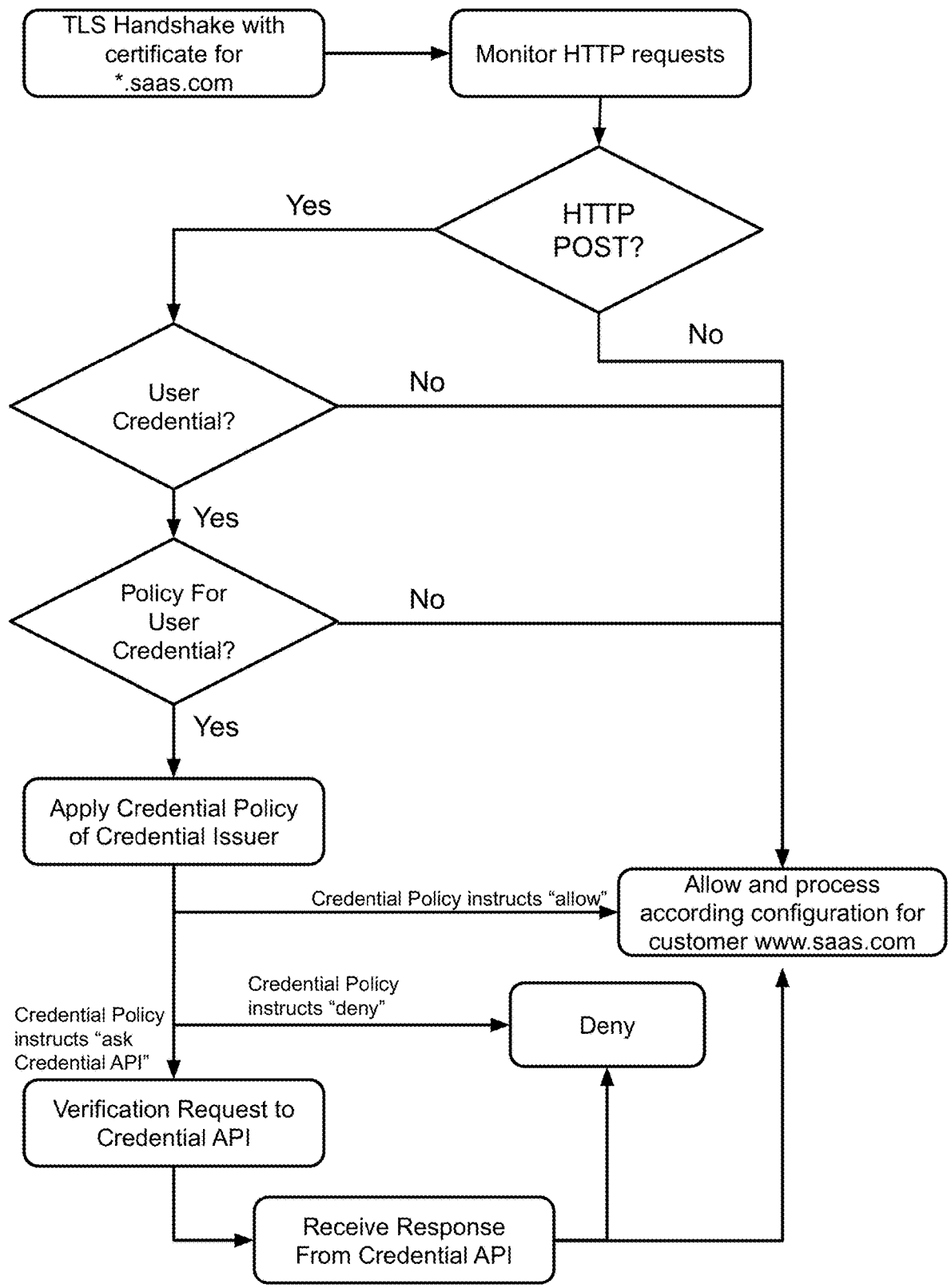
FIG. 3 is a flow diagram illustrating one embodiment of logic executed at the reverse proxy server 102 shown in FIG. 1, in one embodiment.
Figure 4:
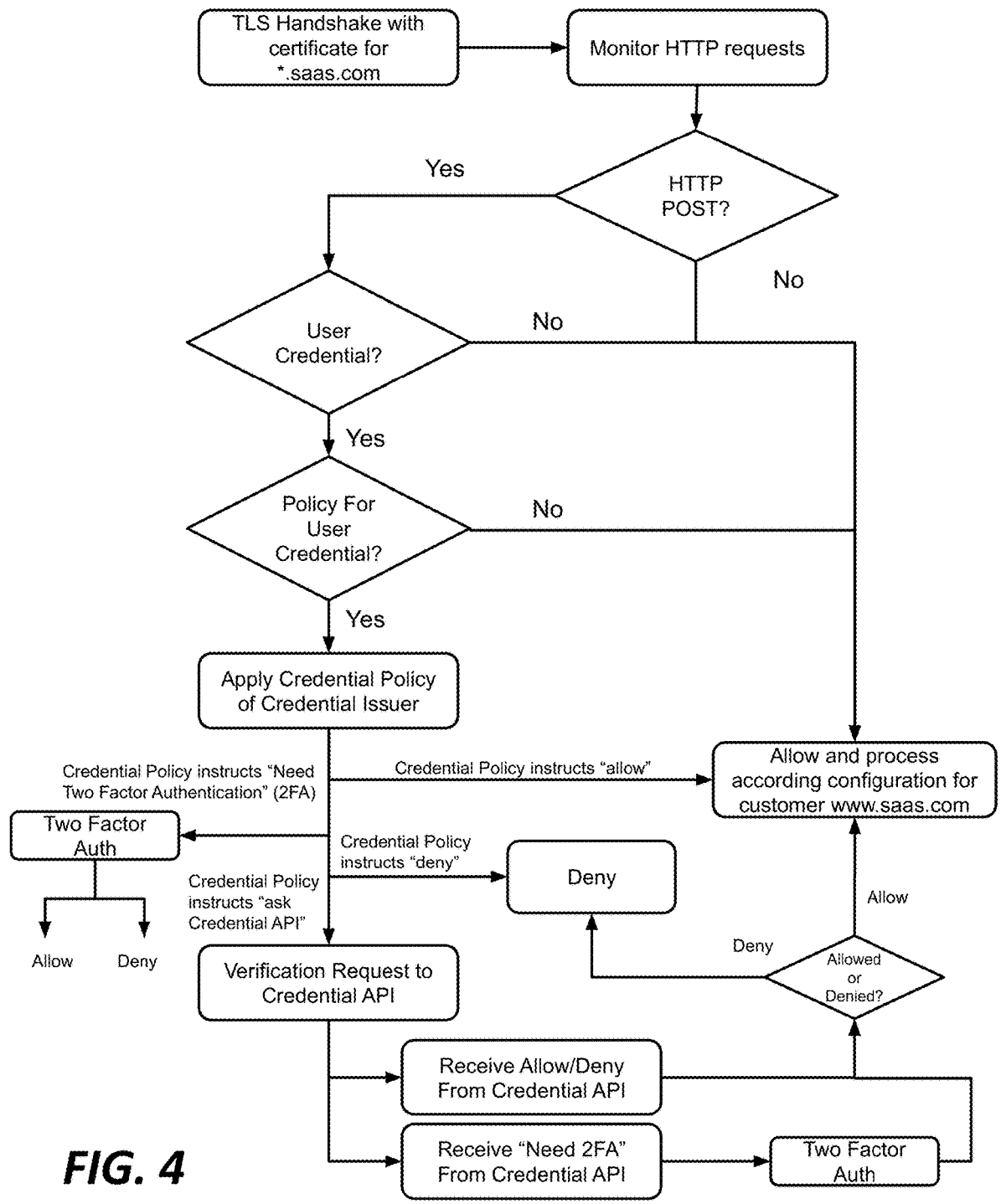
FIG. 4 is a flow diagram illustrating one embodiment of logic executed at the reverse proxy server 102 shown in FIG. 1, in another embodiment.

FIG. 3 shows a flow diagram of a method of operating the reverse proxy server 102 in FIG. 1. FIG. 4 shows a flow diagram of a method of operating the reverse proxy server 102 in FIG. 2.

The method shown in FIG. 3 begins with a TLS handshake in which the reverse proxy server 102 presents the certificate of the web application provider for www.saas.com. Once a TLS session is established the client may send one or more HTTP requests over the wire to the reverse proxy server the reverse proxy server monitors these messages. The reverse proxy server 102 monitors for an HTTP POST request, which as noted may be a potential authentication request with a user credential.

Then, the method moves to the test for the presence of a known user credential. Of course, in other embodiments, additional criteria may be used to determine whether to examine the HTTP POST request, and in other embodiments, other request types and/or application layer message types can be monitored for use of a user credential.

The method next checks to ensure that a policy exists for the user credential domain. This means for example, that the server checks to see if it has locally (or can fetch) a policy for the 'company' domain in john.doe@company.com. In some embodiments, Bloom filters or other fast, probabilistic lookup structures, can be used to quickly check this or other conditions. The step of checking for an applicable policy step may also involve applying certain configured blacklists, to avoid trying to apply policies for public emails, such as john.doe@free-email.com (for embodiments that wish to treat those as domains with no authoritative entity or unsupported).

If the monitored requests are not an HTTP POST or do not contain a user credential or there is no policy for that user credential, then then the credential check is completed and the message is allowed the message is the HTTP request is processed in accord with the 'metadata' customer configuration for the web application.

If there is an HTTP POST message with a user credential and policy, the reverse proxy server applies the stored credential policy that was configured by the credential owner. The corresponding policy to apply is selected, based on the content of the credential itself, e.g., a domain name therein or other data therein. The result of the policy application may be to allow the request, deny the request, or to issue a verification message to the Credential API 106. If the latter, the Credential API server 106 will then respond with a directive that allows or denies the use of the credential.

FIG. 4 is largely similar to FIG. 3, except that the flow incorporates a two factor authentication (2FA). The reverse proxy server 102 gets an instruction to perform two factor authentication either in the local policy (e.g. for all users in the matched domain) or in the response from the Credential API server 106. The two factor authentication may be performed by the reverse proxy server 102 itself, or delegated by the reverse proxy service to a third party service (e.g., a two factor authentication platform). In another alternative, the Credential API 106 server can be responsible for performing the two factor authentication process (e.g., either itself or delegating to another entity), prior to issuing a decision about whether to allow the request. In this alternative, the Credential API server 106 simply sends an allow or deny to the reverse proxy server 102 based on the result of the two factor authentication and the Credential API server's configuration settings.

While not shown explicitly in FIG. 4, the result of that two factor authentication process drives the ultimate determination of whether the use of the credential is allowed, e.g., if the user approves as part of the two factor authentication process the use is allowed; if the user does not or other error arises, then the use is denied. The authentication settings for individual identities or organizations may specify how to handle a denial situation: there could be any of a wide variety of responses or absence of response, at the discretion of the infrastructure and policy stakeholders.

Figure 5:
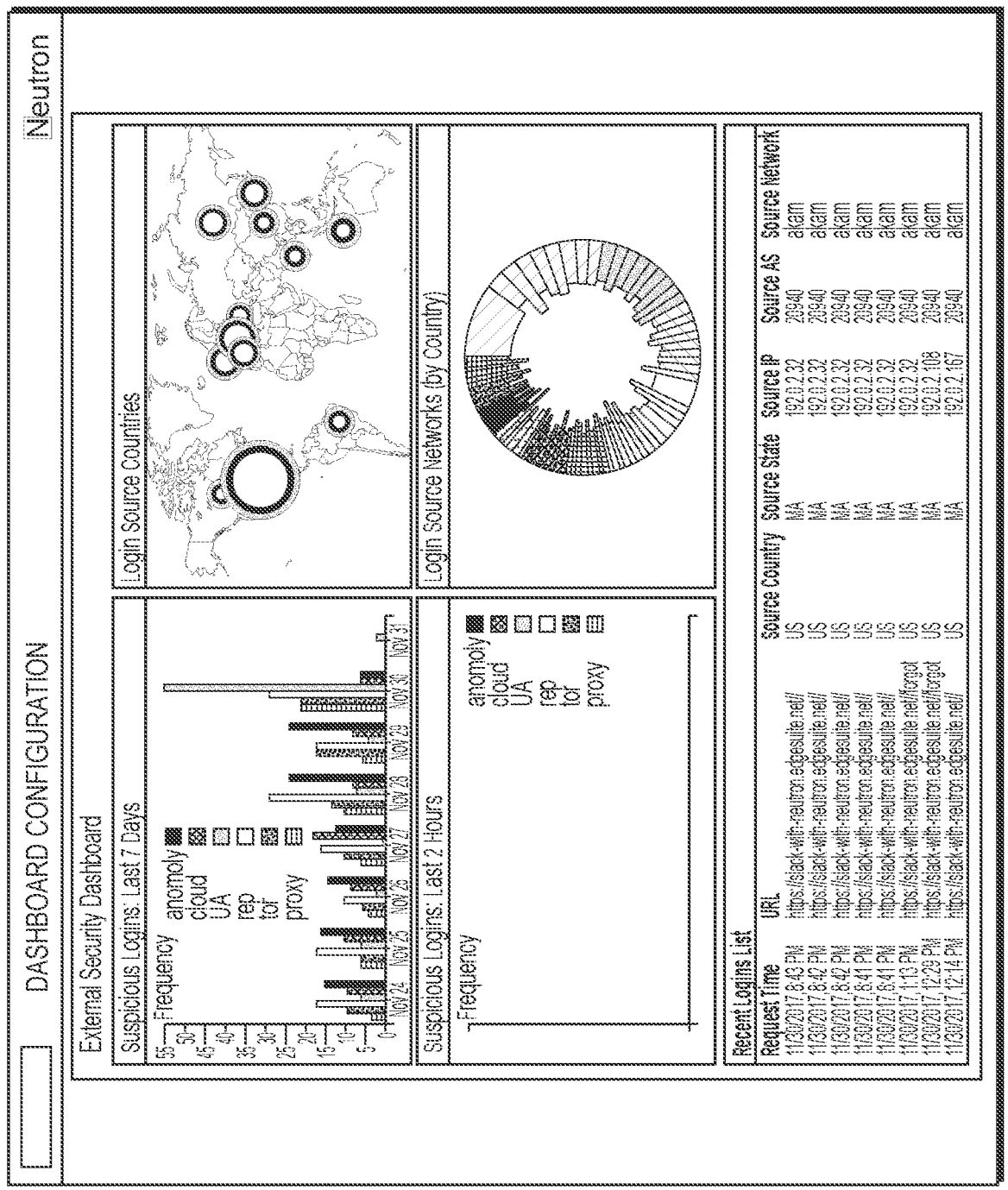
FIG. 5 is a diagram of a graphical user interface for reporting about a user credential to a credential owner.

FIG. 5 is an example of a dashboard that can be created from the data collected by the Credential API server 106 and presented to a system administrator of the enterprise 104*a*. Anomalous login attempts are reported in the dashboard, revealing recent daily and hourly levels of authentication anomaly (categorized by type), and source geographies (as a map and sunburst chart for AS analysis). Also shown are recent anonymous samples of countries/IP addresses and sites where the user credential was used.

The information can help secure the enterprise customer's own IT infrastructure 104*b*, because valid anomalous logins to external sites can move laterally to use the same account on critical assets. Also, if there are many successful anomalous logins (or a significant spike), it may mean that the enterprise 104*a* customer's internal security has been breached, and new security measures are needed.

The dashboard can also be a place to review alerts. Reviewing the dashboard, as well as the alerts, can reveal that an email or other login account may have been compromised or is being used out of policy by the user.

FIGS. 6-9 show—in additional detail—some diagrams that can be incorporated into the user dashboard to illustrate important data about the use of one or more user credentials being monitored. The underlying dataset displayed in FIGS. 6-9 could be just one user credential, or a set of many user credentials, even the entire user credential population for a given organization. A system administrator can select the population of user credentials (or individual user credential) for which the data visualization applies.

Figure 6:
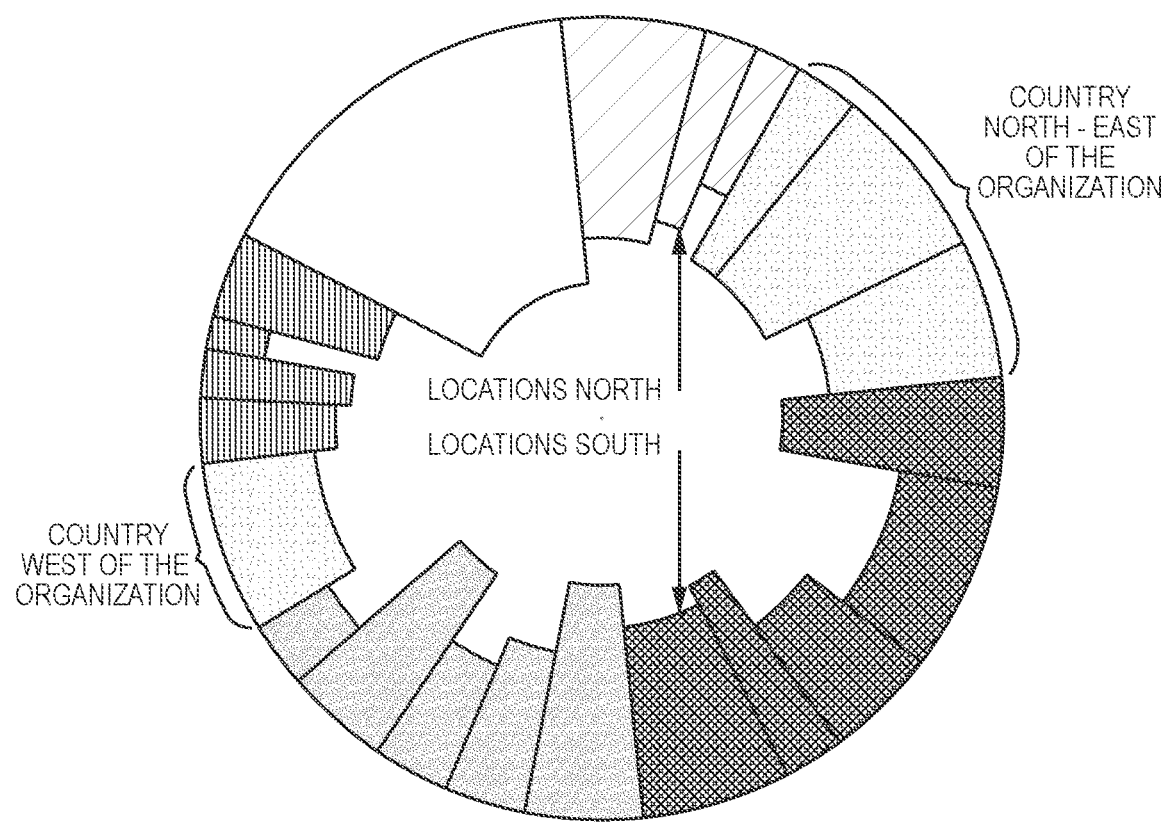
FIG. 6 is a diagram for use with a graphical user interface and illustrating relative geographic locations where one or more user credentials have been observed in use, relative to the organization monitoring that credential, in accordance with one embodiment.

FIG. 6 shows, for one or more user credentials, the country in which the credential(s) were used. Here, the location of "use" of a credential typically means that of the source of the client request; e.g., the location of the client device 100 and its source IP address in FIG. 1. The visualization could be changed such that the location of "use" could be defined as that of the target of the client request, e.g., origin server 108 in FIG. 1, if the credential owner found that of interest.

FIG. 6 can be thought of as a enhanced pie chart in which each slice represents a country (or other geographical unit) and the area of a given slice corresponds to the Observed volume of use of a user credential in that country. Traditionally, such pie slices are sorted alphabetically or by volume. In contrast, in FIG. 6, the position of a given slice relative to the center of the pie is oriented such that it indicates the location of and/or bearing to the country with observed activity relative to the location of the organization that owns the user credentials. Put another way, the organization is assumed to be at the center of the pie; slices to the upper-right represent geographies to the northeast of the organization; slices to the left of center represent geographies to the west of the organization; slices above center represent geographies to the north of the organization, slices below center represent geographies to the south of the organization, and so on, aiding the user to faster visual interpretation and navigation, for tactical analysis benefits.

The above visualization advantageously gives a user a sense of orientation in their reading of the chart.

Figure 7:
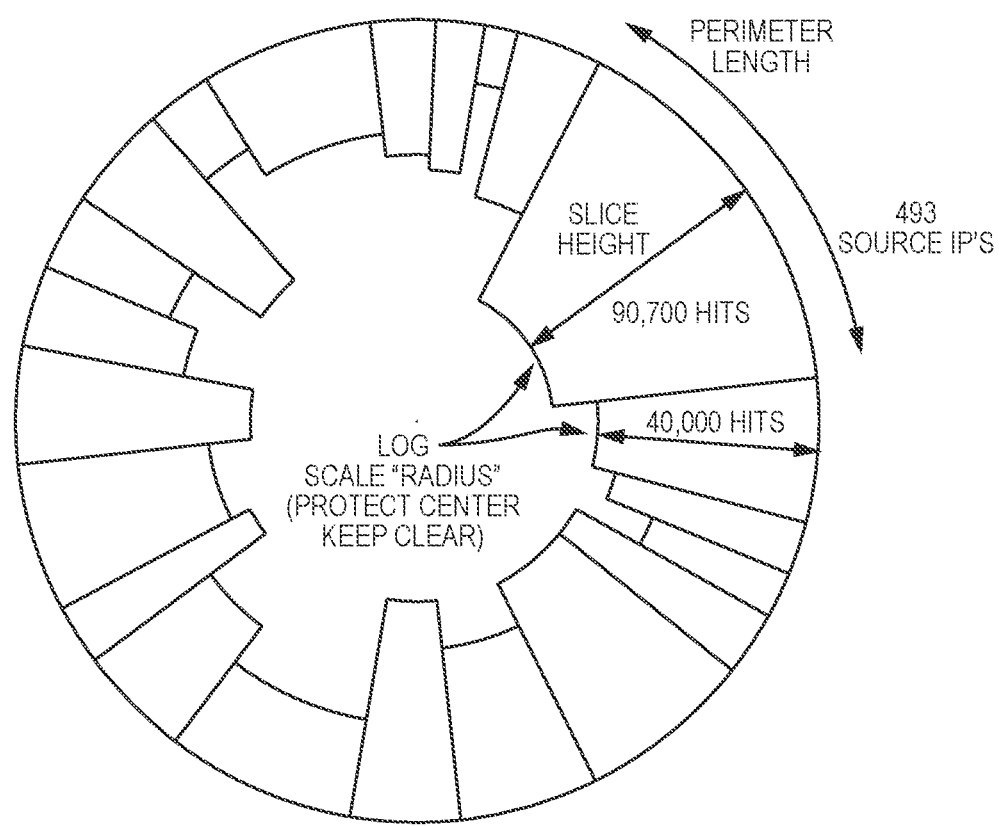
FIG. 7 is a diagram for use with a graphical user interface and illustrating source IP addresses associated with the use of one or more user credentials, in accordance with one embodiment.

FIG. 7 visualizes the use of user credentials in a different way. In FIG. 7, the slices of the pie represent blocks of source IP addresses from which the user credential was received. The length along the perimeter of the slice indicates breadth, i.e., the number of IP addresses in the block; the height of the slice indicates volume, i.e., the number of hits received from that IP address block, and it is preferably logarithmic in scale.

As those skilled in the art will understand, the visualization in FIG. 7 (and the other FIGS.) can be used with data other than IP address and hit counts, where perimeter length is proportional to data cardinality (such as for counts of IP, Subnet, or Autonomous System network) and height indicates volume, e.g. by being drawn inwards from the pie chart edge or otherwise signifying activity originating externally.

Figure 8:
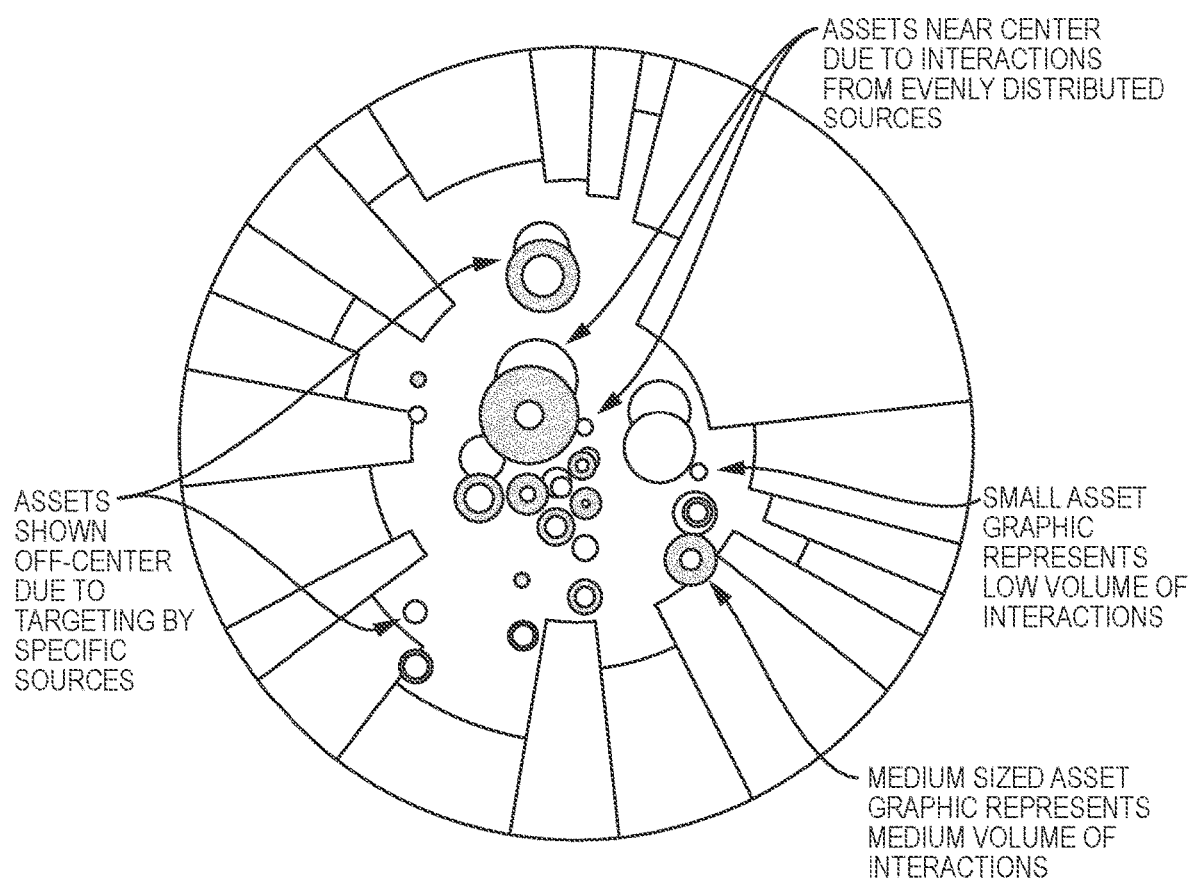
FIG. 8 shows the diagram of FIG. 7 with graphics in the center that each correspond to the use of specific user credential (asset) across the source IP addresses, in accordance with one embodiment.

FIG. 8 is an enhanced version of the visualization in FIG. 6 and FIG. 7. FIG. 8 differs from FIGS. 6-7 because it contains circles near the center, also referred to as bubbles, which represent specific user credentials that exhibited relevant activity. This kind of visualization may also display activity directed towards other, non-credential assets owned by the organization, such as hostnames, exposed IPs, data centers, etc, monitored through means not covered under these claims. The appearance of the bubble communicates two metrics specific to the user credential or other asset. One metric is the volume of activity (showing total, verified or suspicious volume), which is represented by the radius of the bubble. The second metric is the location of the activity, which is represented by the position of the circle relative to the slices. Preferably the location is determined using some weighted average of the slice location (country, AS or otherwise) aggregated across its activity records. For example, user credentials incurring activity only from one such location will be displayed adjacent to the location's slice of the pie chart in FIG. 8 (whether slices are by city, country or by network). On the contrary, credentials exhibiting a balanced distribution of activity from multiple geographies or networks would appear in the center of the visualization. Analysts would find, in general, that only in rare cases do users would login from highly distributed set of sources (e.g., which might be the case when the period of data collected is short). An example of a weighted average algorithm here is showing a User Credential at a geometric position calculated using a modified barycentric coordinate algorithm, as follows:
 (i) for each slice, tally the number of request records or IPs originating from that slice;
 (ii) optionally modify this number (e.g., applying any mathematical function to the number resulting from (i), or alternatively a fixed/constant fraction); this could highlight different characteristics from the traffic, like minority vs majority geographies for each user credential or other asset.
 (iii) use this number as a weight, i.e. multiplier, for the cartesian or polar coordinates of the slice.

In some embodiments, the user credential or other 'asset' bubbles may be displayed with a ring inside or as their edge, and this ring may be shown in a different color, so as to evidence the suspicious vs verified sums of activity records directed to that asset or user credential. For example, a bubble with a highly distributed and anomalous set of sources might be displayed with a red ring, while others were green.

Figure 9:
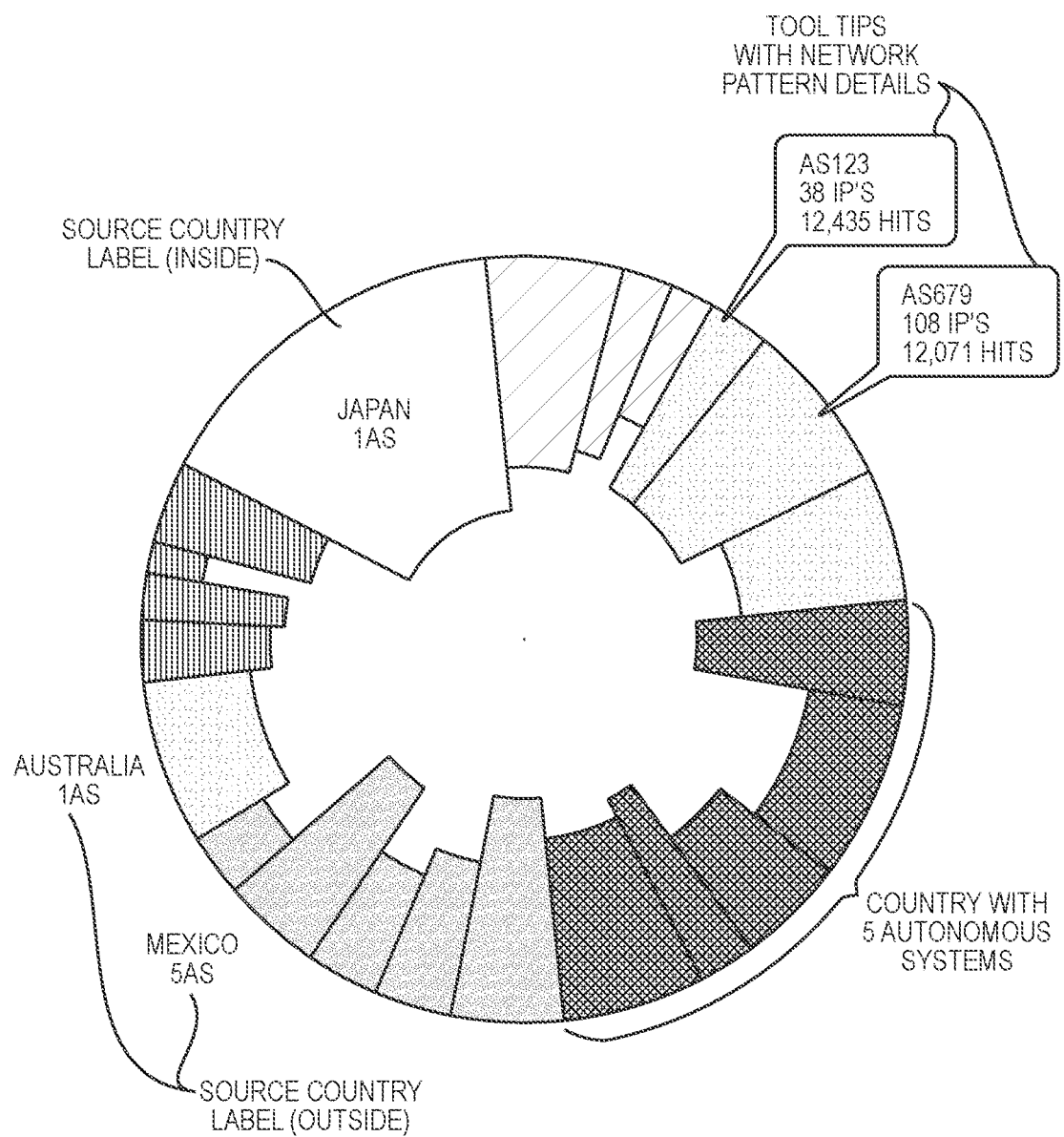
FIG. 9 is a diagram for use with a graphical user interface and illustrating source countries where a given user credential has been observed in use, with network information, in accordance with one embodiment.

FIG. 9 is yet another kind of visualization showing observed use of one or more user credentials. In this visualization, each slice of the pie represents a source autonomous system (AS) the is present within a given country; hence a country is represented by a group of AS slices that are colored, shaded, or textured similarly, and preferably adjacent. Additional details such as unique IP addresses and hit counts are also available for each slice. Slice groups (countries) may be separated with gaps as with traditional pie charts, with such gaps being independent from the spacing between the group's components which may be smaller or inexistent.

While the foregoing description of the visualizations shown in FIGS. 6-9 focuses on display of the use of User Credentials, the visualizations are not so limited and do not need to be used in conjunction with the User Credential monitoring techniques described elsewhere in this document. The visualizations shown in FIGS. 6-9 may be utilized to display and analyze a wide range of data sets produced via organization monitoring of its network and infrastructure. Use cases include enterprise security, web security, enterprise and web analytics, and other things. For example, an organization might be monitoring potentially malicious traffic at an enterprise firewall and in doing so, collecting source IP addresses trying to contact enterprise assets. Such source IP addresses could be visualized using the FIGS. 6-9 approaches. For example, a slice in FIG. 6 could represent all observed source IP traffic from a geographic unit, rather than only the traffic associated with a given user credential. The observed traffic could be all inbound traffic, or only that targeting a particular firewall or data center of the organization. The technique described in FIG. 8 can help visualize each such "target" relative to source geographies, using the proposed modified barycentric position. As another example, the enhanced pie chart could be built based on the clients attempting to contact a particular organization DNS hostname of interest, where activity on "localized" domains such as eu.company.com would likely show next to their expected source geography. Generalizing, the visualizations could be used to show the distribution and nature of Internet traffic targeting or otherwise related to any organization asset.

The specialized visualization may also be utilized in analytics of activity originating from external sources that targets user credentials, with alternative assets owned by the organization, such as IPs, IP blocks (eg data centers), hostnames, or applications—while retaining other aspects of the paradigm of requestor-target-classification being visualized.

Anonymization Details

As mentioned above, in a preferred embodiment, the reverse proxy server 102 anonymizes the user credential before passing it to the Credential API 106, e.g., via a hash function. For example, for a user credential such as email extracted from the HTTP POST, the reverse proxy server 102 can hash the full email address and, independently hash the domain name, thus creating two hashes, which are encrypted with different keys. Both hashes can be sent to the Credential API 106. This approach allows the Credential API 106 to quickly evaluate which credential owner corresponds (and thus credential policy) applies, while enabling the full credential (i.e., the full email address) to be considered independently. Preferably, the key used to encrypt the full credential is specific to that credential owner (or to the credential owner's domain). This prevents the credential owner of one domain accessing the data of all domains if they get access to the full credential server database, e.g., in the Credential API 106 and/or reverse proxy server 102. The credential owner may be given the anonymized equivalent of the user credential, by way of which they may consult or correctly interpret the credential API 106 monitoring and visualizations, in the instance where anonymization otherwise obfuscates the true identity of credentials that incurred noteworthy suspicious or verified activity Public Infrastructure for Credential Policies An extension of the above work will now be described. In FIG. 1, at S2, there is a credential policy sent from the credential owner to the reverse proxy server 102. In an alternative embodiment, rather than sending policies, credential owners can publish a set of relatively static security rules publicly via DNS. Internet providers, cloud services providers and CDNs would be able to obtain and apply the published security rules, similar to what has already been achieved in the case of certificate authority authorization rules. The policies could also be distributed using other application layers protocols, such as HTTP.

The lookup to the policy in DNS could result in a TXT record, could load asynchronously, and DNSSEC could protect the integrity of the contents. Such a public policy could include a wide variety of information, examples include the following:
 Positive or negative security modes (whitelist or blacklist)
 IP Location and user agent rule
 AS numbers and CIDR subnets to trust or prevent during logins belonging to the credential owner that sets the policy URLs to report violations (this is already implemented by _DMARC DNS records, where DMARC means Domain-Based Message Authentication, Reporting and Conformance)

URLs to dynamically validate a user login (e.g., the Credential API 106 URL)

Actions to take (e.g., block, redirect, or require email confirmation to finish an anomalous login with a second form of validation).

The DNS records that propagate the domain's policy could be cached across a CDN's platform. This would allow low-latency or virtually zero-latency decisions to be taken in cases where the static policy is sufficient for reverse proxy 102 to make a decision without a request to Credential API 106

Content Delivery Networks

As the teachings hereof can be used in the context of a CDN, a general overview of CDN components and operation is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 10:
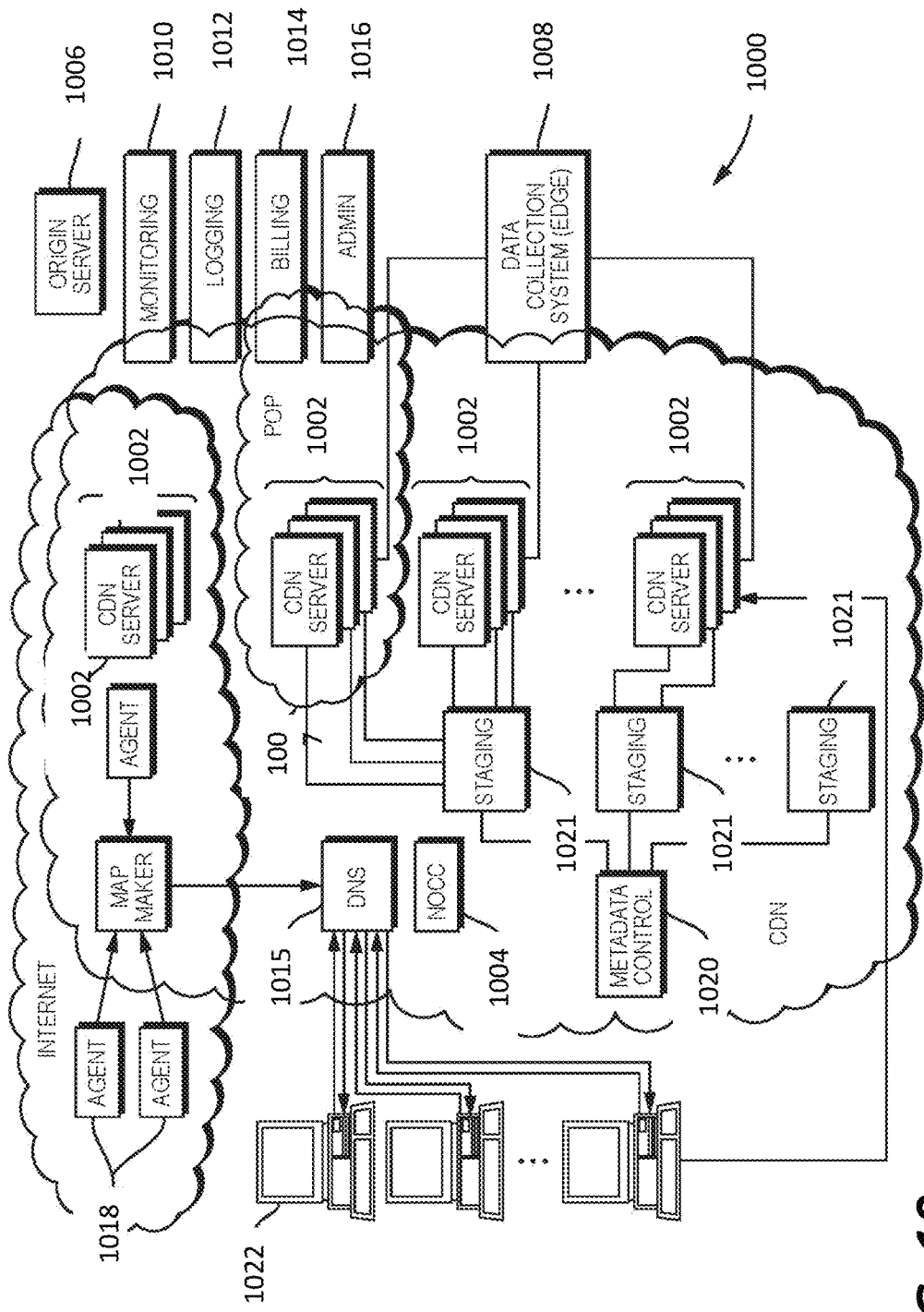
FIG. 10 is a diagram of a content delivery network, in one embodiment.

In a known system such as that shown in FIG. 10, a distributed computer system 1000 is configured as a content delivery network (CDN) and is assumed to have a set of machines 1002 distributed around the Internet. The machines 1002 are servers can be reverse proxy servers enhanced with the teachings of this patent document described with respect to the reverse proxy server 102.

A network operations command center (NOCC) 1004 may be used to administer and manage operations of the various machines in the system. Third party sites affiliated with content providers, such as web site 1006, offload delivery of content (e.g., HTML or other markup language files, embedded page objects, streaming media, software downloads, and the like) to the distributed computer system 1000 and, in particular, to the servers 1002 (which are sometimes referred to as content servers, or sometimes as "edge" servers in light of the possibility that they are near an "edge" of the Internet). Such servers may be grouped together into a point of presence (POP) 1007.

Typically, content providers offload their content delivery by aliasing (e.g., by a DNS CNAME) given content provider domains or sub-domains to domains that are managed by the service provider's authoritative domain name service. End user client machines 1022 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 10, the distributed computer system may also include other infrastructure, such as a distributed data collection system 1008 that collects usage and other data from the CDN servers, aggregates that data across a region or set of regions, and passes that data to other back-end systems 1010, 1012, 1014 and 1016 to facilitate monitoring, logging, alerts, billing, management and other operational and administrative functions. Distributed network agents 1018 monitor the network as well as the server loads and provide network, traffic and load data to a DNS query handling mechanism 1015, which is authoritative for content domains being managed by the CDN. A distributed data transport mechanism 520 may be used to distribute control information (e.g., metadata to manage content, to facilitate load balancing, and the like) to the CDN servers.

A given server in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 1002 may be configured to provide one or more extended content delivery features, preferably on a domain-specific, content-provider-specific basis, preferably using configuration files that are distributed to the CDN servers using a configuration system. A given configuration file preferably includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "Net-Storage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 11:
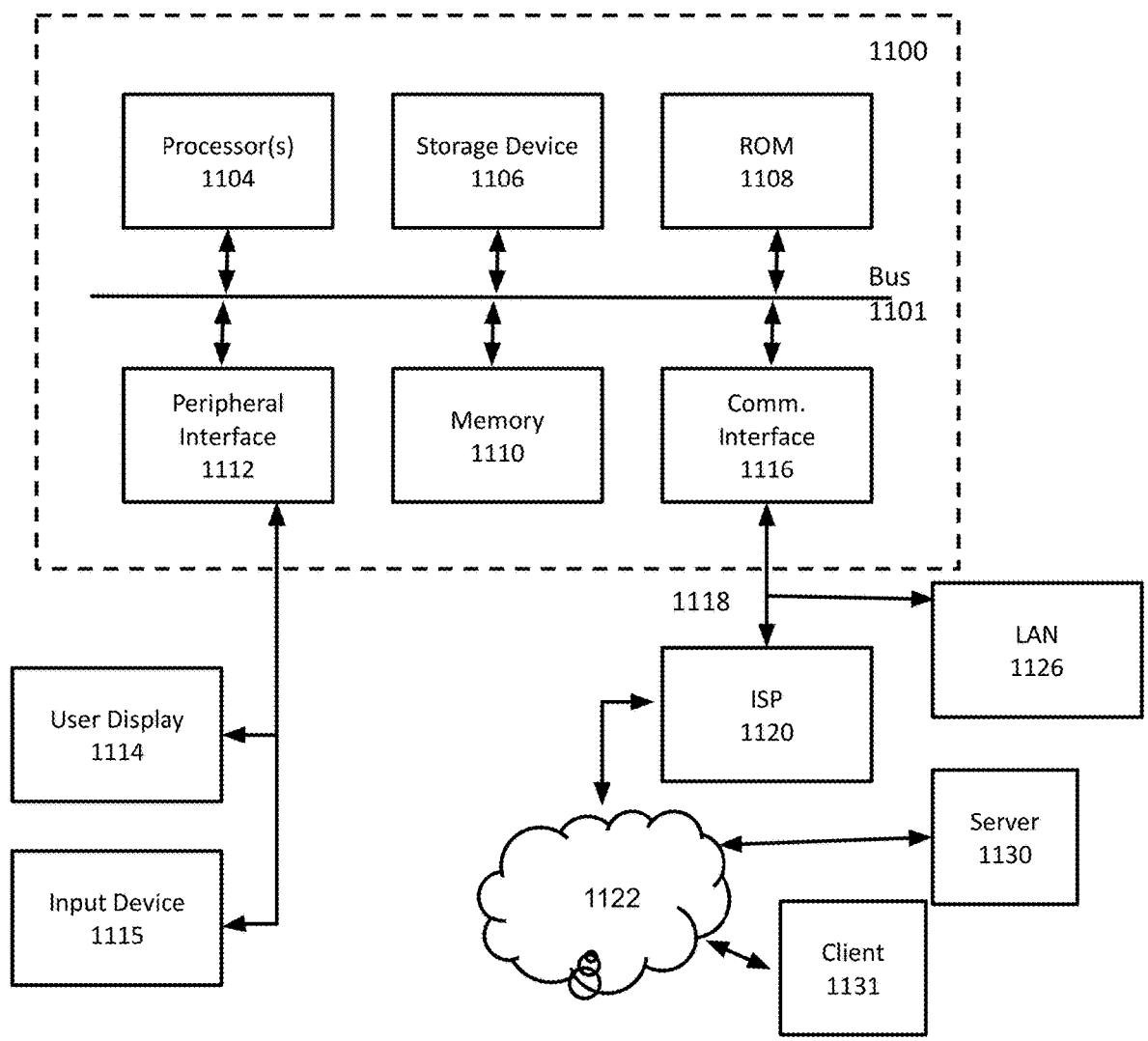
FIG. 11 is a block diagram illustrating hardware in a computer system that may be used to implement the teachings hereof.

FIG. 11 is a block diagram that illustrates hardware in a computer system 1100 upon which such software may run in order to implement embodiments of the invention. The computer system 1100 may be embodied in a client device, server, personal computer, workstation, tablet computer, mobile or wireless device such as a smartphone, network device, router, hub, gateway, or other device. Representative machines on which the subject matter herein is provided may be Intel-processor based computers running a Linux or Linux-variant operating system and one or more applications to carry out the described functionality.

Computer system 1100 includes a microprocessor 1104 coupled to bus 1101. In some systems, multiple processor and/or processor cores may be employed. Computer system 1100 further includes a main memory 1110, such as a random access memory (RAM) or other storage device, coupled to the bus 1101 for storing information and instructions to be executed by processor 1104. A read only memory (ROM) 1108 is coupled to the bus 1101 for storing information and instructions for processor 1104. A non-volatile storage device 1106, such as a magnetic disk, solid state memory (e.g., flash memory), or optical disk, is provided and coupled to bus 1101 for storing information and instructions. Other application-specific integrated circuits (ASICs), field programmable gate arrays (FPGAs) or circuitry may be included in the computer system 1100 to perform functions described herein.

A peripheral interface 1112 communicatively couples computer system 1100 to a user display 1114 that displays the output of software executing on the computer system, and an input device 1115 (e.g., a keyboard, mouse, trackpad, touchscreen) that communicates user input and instructions to the computer system 1100. The peripheral interface 1112 may include interface circuitry, control and/or level-shifting logic for local buses such as RS-485, Universal Serial Bus (USB), IEEE 1394, or other communication links.

Computer system 1100 is coupled to a communication interface 1116 that provides a link (e.g., at a physical layer, data link layer,) between the system bus 1101 and an external communication link. The communication interface 1116 provides a network link 1118. The communication interface 1116 may represent a Ethernet or other network interface card (NIC), a wireless interface, modem, an optical interface, or other kind of input/output interface.

Network link 1118 provides data communication through one or more networks to other devices. Such devices include other computer systems that are part of a local area network (LAN) 1126. Furthermore, the network link 1118 provides a link, via an internet service provider (ISP) 1120, to the Internet 1122. In turn, the Internet 1122 may provide a link to other computing systems such as a remote server 1130 and/or a remote client 1131. Network link 1118 and such networks may transmit data using packet-switched, circuit-switched, or other data-transmission approaches.

In operation, the computer system 1100 may implement the functionality described herein as a result of the processor executing code. Such code may be read from or stored on a non-transitory computer-readable medium, such as memory 1110, ROM 1108, or storage device 1106. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 1118 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A system for protecting a user credential issued by an organization, the system comprising:
   A. at least one server forming an infrastructure that stores user credential information defined by an organization that issued corresponding user credentials, the user credential information comprising:
      information about usage of user credentials outside of a network of the organization, the information indicating at least one destination that the organization permits for the user credentials and at least one destination that the organization does not permit for the user credentials;
   B. a reverse proxy server, outside the network of the organization and acting on behalf of a particular web application, that is operable to proxy application layer traffic from end user clients located outside the network of the organization to the particular web application, where, upon detecting a login attempt directed to the particular web application with a given user credential issued by the organization, the reverse proxy server is operable to:
      (i) extract the given user credential and query the infrastructure about the given user credential, and,
      (ii) receive a response to the query served from the infrastructure, the response based on the user credential information and indicating whether the usage of the user credentials with the particular web application is permitted, and,
      (iii) handle the login attempt in accord with the response;
   C. where the login attempt originates from outside of the network of the organization, and the particular web application is outside of and distinct from any system federated with the organization;
   D. where the reverse proxy server caches the response from the at least one server for use in subsequent login attempts; and,
   E. where the at least one server forming the infrastructure and the reverse proxy server each comprise at least one hardware processor and memory holding computer program instructions to be executed on the at least one hardware processor to provide operations as described above.

2. The system of claim 1, wherein the infrastructure comprises a publicly accessible infrastructure.

3. The system of claim 2, wherein the infrastructure comprises one or more DNS servers.

4. The system of claim 1, wherein the user credential information associated with the given user credential applies to a plurality of user credentials within a domain.

5. The system of claim 1, wherein the user credential information associated with the given user credential further comprises:
   a validation URL for dynamic validation of a login attempt.

6. The system of claim 1, wherein the response further comprises:
   an action to take upon detection of prohibited usage of user credentials.

7. The system of claim 1, wherein the information about usage indicates the particular web application based on IP address.

8. A method, comprising:
   providing an infrastructure that stores user credential information defined by an organization that issued corresponding user credentials, the user credential information comprising:
      information about usage of the user credentials outside of a network of the organization, the information indicating at least one destination that the organization permits for the user credentials and at least one destination that the organization does not permit for the user credentials;
   providing a reverse proxy server, outside the network of the organization and acting on behalf of a particular web application, that proxies application layer traffic from end user clients located outside of the network of the organization to the particular web application, where, upon detecting a login attempt directed to the particular web application with a given user credential issued by the organization, the reverse proxy server is operable to:
      (i) extract the given user credential and query the infrastructure about the given user credential, and, (ii) receive a response to the query served from the infrastructure, the response based on the user credential information and indicating whether the usage of the user credentials with the particular web application is permitted, and, (iii) handle the login attempt in accord with the response, (iv) cache the response from the infrastructure for use in subsequent login attempts;

where the login attempt originates from outside of the network of the organization, and the particular web application is outside of the network of the organization and distinct from any system federated with the organization.

9. The method of claim 8, wherein the infrastructure comprises a publicly accessible infrastructure.

10. The method of claim 9, wherein the infrastructure comprises one or more DNS servers.

11. The method of claim 8, wherein the user credential information associated with the given user credential applies to a plurality of user credentials within a domain.

12. A non-transitory computer readable medium holding computer program instructions that when executed cause at least one computer to:

provide an infrastructure that serves user credential information defined by an organization that issued corresponding user credentials, the user credential information comprising:

information about usage of user credentials outside of a network of the organization, the information indicating at least one destination that the organization permits for the user credentials and at least one destination that the organization does not permit for the user credentials provide a reverse proxy server, outside the network of the organization and acting on behalf of a particular web application, that proxies application layer traffic from end user clients located outside the network of the organization to the particular web application, where, upon detecting a login attempt directed to the particular web application with a given user credential issued by the organization, the reverse proxy server is operable to:

(i) extract the given user credential and query the infrastructure about the given user credential, and, (ii) receive a response to the query served from the infrastructure based on the user credential information and indicating whether the usage of the user credentials with the particular web application is permitted, and, (iii) handle the login attempt in accord with the response, (iv) cache the response from the infrastructure for use in subsequent login attempts;

where the login attempt originates from outside of the network of the organization, and the particular web application is outside of the network of the organization and distinct from any system federated with the organization.

* * * * *